United States Patent [19]  
Green

[11] 4,276,352  
[45] Jun. 30, 1981

[54] REINFORCED COMPOSITES CONTAINING UNSATURATED POLYIMIDE RESINS

[75] Inventor: George E. Green, Stapleford, England

[73] Assignee: Ciba-Geigy Corporation, Ardsley, N.Y.

[21] Appl. No.: 87,138

[22] Filed: Oct. 22, 1979

Related U.S. Application Data

[63] Continuation of Ser. No. 910,403, May 30, 1978, abandoned.

[30] Foreign Application Priority Data

Jun. 1, 1977 [GB] United Kingdom ............... 23174/77

[51] Int. Cl.³ .................... B32B 27/06; C08F 8/00; C08G 23/10
[52] U.S. Cl. .................... 428/473.5; 204/159.15; 525/180; 525/183; 525/923; 525/925; 528/322; 428/260
[58] Field of Search ............... 525/180, 183, 923, 925; 428/473.5, 260; 528/322; 204/159.15

[56] References Cited

U.S. PATENT DOCUMENTS

| 3,018,290 | 1/1962 | Sauers | 260/326.3 |
|---|---|---|---|
| 3,522,271 | 7/1970 | Kalil | 260/326.3 |
| 3,562,223 | 2/1971 | Lyon et al. | 260/78 |
| 3,651,012 | 3/1972 | Holub | 260/47 UA |
| 3,658,764 | 4/1972 | Bargain et al. | 260/78 UA |
| 3,766,302 | 10/1973 | Holub | 260/884 |
| 3,832,187 | 8/1974 | Kleeberg et al. | 96/115 R |
| 3,839,493 | 10/1974 | Balme et al. | 260/830 P |
| 3,840,495 | 10/1974 | Balme et al. | 260/6 S |
| 3,887,582 | 6/1975 | Holub et al. | 260/326.26 |
| 3,900,449 | 8/1975 | Rembold et al. | 260/78 UA |
| 3,902,902 | 9/1975 | Kleeberg et al. | 96/35.1 |
| 3,925,314 | 12/1975 | Renner et al. | 260/47 UA |
| 3,944,525 | 3/1976 | Darmory et al. | 260/47 UA |
| 4,013,600 | 3/1977 | Cassat | 260/17.4 ST |
| 4,017,453 | 4/1977 | Heilman et al. | 260/837 RV |
| 4,025,407 | 5/1977 | Chang et al. | 260/858 |
| 4,035,345 | 7/1977 | Ducloux et al. | 528/322 |
| 4,038,251 | 7/1977 | Forgó et al. | 260/47 UA |
| 4,038,450 | 7/1977 | Balme et al. | 428/268 |
| 4,065,433 | 12/1977 | Muller et al. | 260/47 UA |
| 4,066,621 | 1/1978 | Müller | 526/259 |
| 4,080,484 | 3/1978 | Mathias | 525/925 |
| 4,100,140 | 7/1978 | Zahir et al. | 526/313 |
| 4,160,859 | 7/1979 | Renner et al. | 528/322 |

FOREIGN PATENT DOCUMENTS

| 50-100500 | 8/1975 | Japan. |
|---|---|---|
| 1400512 | 7/1975 | United Kingdom. |
| 1443067 | 7/1976 | United Kingdom. |
| 1492758 | 11/1977 | United Kingdom. |
| 1502799 | 3/1978 | United Kingdom. |

*Primary Examiner*—William R. Dixon, Jr.  
*Attorney, Agent, or Firm*—Harry Falber

[57] ABSTRACT

Fibrous-reinforced composites, such as prepregs and sheet moulding compounds, are made with a thermosettable unsaturated polyimide resin, a photopolymerizable compound, and a heat-activated curing agent for the resin. Fibers may be impregnated with a liquid mixture of the resin and the photopolymerizable compound, and irradiated to cause the mixture to solidify through photopolymerization. The product, when desired, e.g., after stacking to form a multilayer laminate or after shaping, is heated to cure the resin. Alternatively, the liquid mixture is irradiated to form a solid film, into which the fibers are pressed, and, when required, the assembly is heated to cure the resin. The resins employed contain at least two maleimide, citraconimide, or itaconimide groups linked through nitrogen atoms thereof to carbon atoms.

28 Claims, No Drawings

REINFORCED COMPOSITES CONTAINING UNSATURATED POLYIMIDE RESINS

This is a continuation of application Ser. No. 910,403 filed on May 30, 1978, now abandoned.

BACKGROUND OF THE INVENTION

This invention relates to reinforced composites containing photopolymerised and thermosettable compositions and fibrous reinforcing materials, and to methods for their production.

Composite structures are commonly made by impregnating fibrous materials, such as fibres of paper, glass, aromatic polyamide, or carbon, metal filaments, and whiskers, usually in the form of layers, with a solution, in a volatile solvent, of a solid thermosettable resin and a heat-activated curing agent for the resin, causing the resin to solidify by evaporation of the solvent, and, when desired, curing the resin composition in the resultant so-called "prepreg" by the action of heat. Frequently, the prepregs are stacked before heat-curing, so that a multilayer laminate is formed.

Sheet moulding compounds are made by impregnating chopped fibrous reinforcement with a liquid thermosettable resin, and then causing the resin to thicken by chemical means such as by reaction of carboxyl groups in the resin with magnesium oxide. The resin is subsequently heat-cured.

Composite structures may also be prepared from films of a thermosettable resin composition by laying a film of the composition containing the resin and the curing agent on a fibrous reinforcement and applying heat and pressure so that the resin composition flows about the fibres but remains curable, and then heating further when desired so that the resin composition is cured by the heat-activated curing agent.

These methods suffer from certain drawbacks. Some thermosettable resin compositions are solid, and if a solvent is used to dissolve the components of the composition it is not always possible to eliminate all traces of it before the final curing takes place, and in consequence the cured composite may contain voids caused by evaporation of such residual solvent. Solvents may cause difficulties due to their toxicity or inflammability or to pollution. If a film adhesive is used, it is usually cast from a liquid thermosettable resin and this is then advanced to the solid state; such a process adds considerably to the cost of the composite. The methods also require a considerable expenditure of heat energy, either to evaporate the solvent or to advance the resin.

In recent years, thermosetting resins containing maleimide or similar groups have become of interest; however, they sometimes present difficulties in the production of composite structures from them, since they, and preferred curing agents therefor, are often solids and cannot readily be thickened for the production of sheet moulding compounds. These thermosetting resins have to be applied to the fibrous reinforcement from solution in an organic solvent, such as N,N-dimethylformamide or dimethyl sulphoxide, with the disadvantages just mentioned. Further, they have not hitherto been readily obtainable in film form.

DETAILED DISCLOSURE

We have now found that fibre-reinforced composites, containing a thermosettable resin composition as the matrix material, may be obtained by impregnating the fibrous reinforcement with such a resin and a photopolymerisable compound and photopolymerising the latter, or by preparing a film from the resin and the photpolymerisable compound and impregnating the reinforcement with the film, without the need to incur the disadvantages set out above.

Accordingly, this invention provides thermosettable composites comprising
(a) a fibrous reinforcing material,
(b) a heat-curable polyimide resin containing, per average molecule, at least two groups of formula

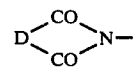

directly attached to carbon atoms, where D denotes

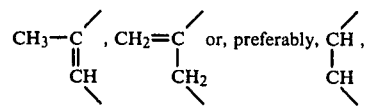

(hereinafter referred to as a "polyimide resin"),
(c), a heat-activated curing agent for the polyimide resin, and
(d), a photopolymerised compound.

British Patent Specification No. 1,377,816 discloses photocrosslinkable compositions containing (i) a film-forming resin having one or more allyl ester groups and (ii) a compound containing one or more maleimido groups. The photo-crosslinked films which are produced may be further crosslinked by heating to 50°. However, the compositions do not contain a heat-activated curing agent for the compounds containing maleimido groups, and the maleimido compound is stated to act both as a copolymerisable component and as a photoinitiator.

It is not necessary, in the present invention, to convert immediately the polyimide resin in the photopolymerised composition distributed on the fibres into the fully cured, insoluble, and infusible C-stage; often, it can be changed into the still fusible B-stage, or remain in the A-stage, and, when desired, e.g., after stacking, and/or after the composite has been formed into some desired configuration, fully cured by heating. For example, if a hollow shaped article is required, it is convenient to impregnate a continuous tow of fibrous reinforcement and wind the tow around a former while, at the same time, exposing the winding to actinic radiation. Such windings still have a certain degree of flexibility, permitting the former to be removed more easily than when a rigid winding is formed in one step. When required, the filament winding is heated to complete the cure.

Also included in this invention are a method of making a reinforced composite which comprises heat-curing a photopolymerised, but still thermosettable, composite of this invention, and heat-cured, reinforced composites made thereby.

A convenient method of preparing the composites of this invention comprises
(i) impregnating a fibrous reinforcing material (a) with a liquid composition comprising
(b) a heat-curable polyimide resin (as herein defined), (c) a heat-activated curing agent for a polyimide resin, (d) a photopolymerisable compound (other than a polyimide resin) and, if desired, (e) a photopolymerisation catalyst for the compound (d), and (ii) in the absence of a substance which gives rise to a substantial degree of photoinduced polymerisation of the polyimide resin, exposing the impregnated material to actinic radiation such that the composition solidifies due to photopolymerisation of the said photopolymerisable compound while the polyimide resin remains substantially in the thermosettable state.

This method is particularly useful for the production of filament windings, and, when chopped strand reinforcing material is used, for the production of sheet moulding compounds.

Another method of preparing composites of this invention from fibrous reinforcing material (a) comprises (i) in the absence of a substance which gives rise to a substantial degree of photoinduced polymerisation of polyimide resins (as herein defined), exposing to actinic radiation a layer of a liquid composition comprising (b) a heat-curable polyimide resin, (c) a heat-activated curing agent for a polyimide resin, (d) a photopolymerisable compound (other than a polyimide resin), and, if desired, (e) a photopolymerisation catalyst for the compound (d), until the said composition solidifies to form an essentially solid continuous film due to photopolymerisation of the said photopolymerisable compound while the polyimide resin remains substantially in the thermosettable state, and (ii) bringing together the film so formed and the fibrous reinforcing material (a) under conditions such that the said film flows about the fibres and the components of the said film and the fibres form a coherent structure but the polyimide resin remains substantially thermosettable.

The latter procedure is particularly convenient when unidirectional fibrous reinforcement is to be used in the production of prepregs, especially if the fibres are short and/or light, because there is less tendency for the fibres to become displaced and the reinforcing effect thereby become irregularly distributed.

Usually, the film and fibrous reinforcing material are brought together with the application of heat and/or pressure. The period of heating can be very short (thereby avoiding curing of the polyimide resin), as there need be no solvent to evaporate and the film need not be thick.

Compositions used to prepare the thermosettable composites of the present invention must be liquid under the conditions used in making the films or in impregnating the reinforcing material before irradiation but are preferably solvent-free.

The reinforcement may be in the form of woven or non-woven cloth, unidirectional lengths, or chopped strands, and may be of natural or synthetic fibres, including strands and filaments, especially glass, boron, stainless steel, tungsten, alumina, silicon carbide, asbestos, potassium titanate whiskers, an aromatic polyamide such as poly(m-phenylene isophthalamide) or poly(p-phenylene terephthalamide), or carbon.

The preferred polyimide resins are of the formula

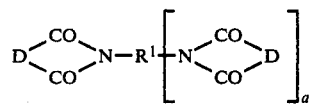

where

D has the meaning previously assigned, $R^1$ is an organic group of valency $(a+1)$, containing from 2 to 30 carbon atoms, and a is 1 or 2.

Further preferred polyimide resins are those of formula II wherein $R^1$ denotes a linear or branched alkylene radical of 2 to 12 carbon atoms;

a phenylene radical, optionally substituted in the ring by 1 to 3 methyl groups or by 1 to 3 fluorine, chlorine, or bromine atoms;

a cyclohexylene radical, optionally substituted in the ring by 1 to 3 methyl groups;

a radical of formula

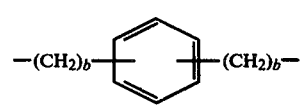

in which b is an integer of from 1 to 3;

a radical of formula

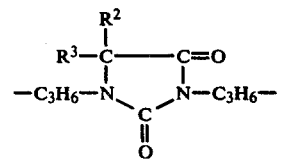

a radical of formula

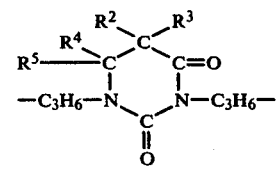

where $R^2$, $R^3$, $R^4$, and $R^5$ each denote a hydrogen atom or the same or a different aliphatic hydrocarbon group of 1 to 6 carbon atoms, with the proviso that $R^2$ and $R^3$ may alternatively, together with the carbon atom to which they are attached, form a 5- or 6-membered aliphatic ring;

a phosphate-, thiophosphate-, phosphite-, or thiophosphite-containing radical of formula

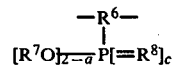

where a has the meaning previously assigned, $R^6$ denotes an aromatic residue of valency $a+2$, containing 6 to 15 carbon atoms, especially a mononuclear benzenoid group or a dinuclear benzenoid group the nuclei of which may be fused, or joined by a carbon-carbon bond only, or joined through an oxygen atom, an alkylene group, or a sulphonyl group, $R^7$ denotes a monovalent aromatic group of 6 to 15 carbon atoms, especially a mononuclear benzenoid group, $R^8$ denotes an oxygen or sulphur atom, and c denotes zero or 1;

a radical of formula

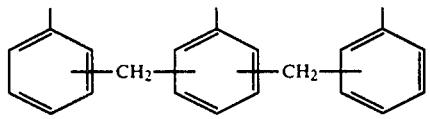

VII a radical of formula

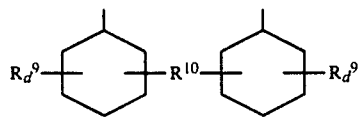

VIII where
$R^9$ denotes a methyl group or a chlorine atom,
d denotes zero or an integer of 1 to 4, and
$R^{10}$ denotes a carbon-carbon bond, or an atom or group of formula —O—, —S—, —CO—, —CH$_2$—, —C(CH$_3$)$_2$—, —SO$_2$—, —CONH—, —COO—, —CONHR$^1$—CONH—, —N:N—, or —NR$^4$—, wherein $R^1$ and $R^4$ have the meanings previous assigned; and especially a radical of formula

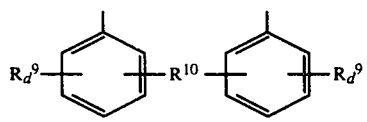

IX where $R^9$, d, and $R^{10}$ have the meanings previously assigned.

Examples of specific polyimide resins are bis(4-maleimidophenyl)-methane, bis(4-itaconamidophenyl)methane, bis(4-citraconamidophenyl)methane, 2,2-bis(4-maleimidophenyl)propane, bis(4-maleimidophenyl) sulphone, bis(4-maleimidophenyl) ether, bis(4-maleimidophenyl) ketone, 1,6-bis(-maleimido)hexane, the isomers of formula

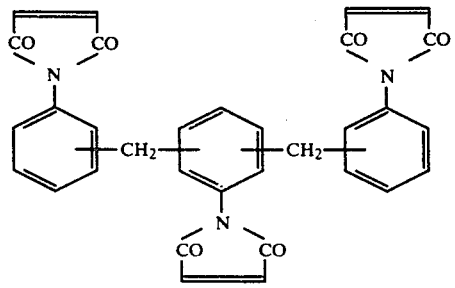

X and 1,3- and 1,4-di(maleimido)benzene.

Such polyimide resins are, in general, known, and can be manufactured by the methods described in U.S. Pat. No. 3,018,290 and British Specification No. 1,137,592, involving reaction of the appropriate polyamine with the unsaturated dicarboxylic acid anhydride in a polar solvent and in the presence of a catalyst.

Heat-curing agents, i.e., those which induce addition polymerisation of the polyimide resin on heating, are well known. They are usually dissolved or suspended in the liquid composition before impregnation of the reinforcement, and an amount effective for curing is employed.

Examples of the preferred agents include diamines and triamines of formula

XI where $R^1$ and a have the meanings previously assigned, particularly those where $R^1$ denotes a divalent radical of formula IX. Specific examples are bis(4-aminophenyl)methane, bis(4-aminophenyl) phenyl phosphate, m-phenylenediamine, hexamethylenediamine, 1,3-bis(3-aminopropyl)-5,5-dimethylhydantoin, and 2,2-bis(4-aminophenyl)propane. The use of such amines to cure polyimide resins is described in, e.g., British Patent Specification No. 1 190 718.

Other curing agents are polyhydric phenols, including mononuclear phenols such as hydroquinone, phloroglucinol, pyrocatechol, and resorcinol, and dinuclear phenols such as those of formula

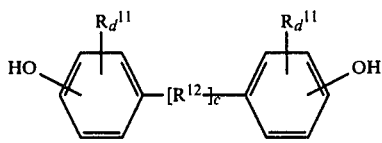

XII where
$R^{11}$ is chlorine or bromine,
$R^{12}$ denotes —CH$_2$—, —C(CH$_3$)$_2$—, —SO$_2$—, or —S—, and
c and d have the meaning previously assigned,
and those containing condensed rings, such as 1,4-dihydroxynaphthalene, and also novolaks of formaldehyde and phenol, cresol, p-chlorophenol, p-tert.butylphenol, p-octylphenol, or p-nonylphenol.

The use of such curing agents is described in German Auslegeschrift No. 2 459 925.

Other suitable curing agents are alkenylphenols or ethers thereof, such as those with saturated or ethylenically unsaturated aliphatic alcohols of up to 6 carbon atoms, preferably an allyl or methallyl-substituted phenol or an ether thereof, including mononuclear compounds such as eugenol and its methyl ether, or a bi- or trinuclear compound containing at least one allyl group and an optionally etherified phenolic hydroxyl group attached to at least one nucleus thereof, especially a compound of formula

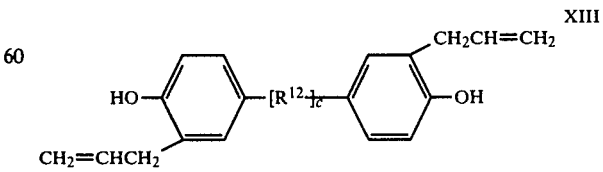

XIII where $R^{12}$ and c have the meanings previously assigned.

The use of such phenols and phenol ethers is described in German Auslegeschrift No. 2 627 045.

Other suitable curing agents include polyhydric alcohols. Preferably, di- or trihydric alcohols are employed, such as branched or straight chain aliphatic alcohols of 2 to 12 carbon atoms, e.g., ethylene glycol, 1,1,1-tris(hydroxymethyl)propane, and glycerol, and also cycloaliphatic and cycloaliphatic-aliphatic alcohols of up to 12 carbon atoms with one or more cycloaliphatic nuclei, which may be joined by an oxygen or sulphur atom, a carbon-carbon bond, or an aliphatic group, wherein the hydroxyl groups are attached to either aliphatic or cycloaliphatic residues, especially those of formula

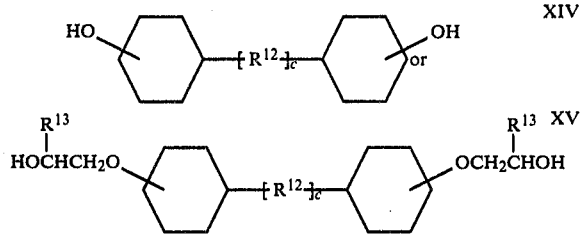

and araliphatic alcohols of the formula

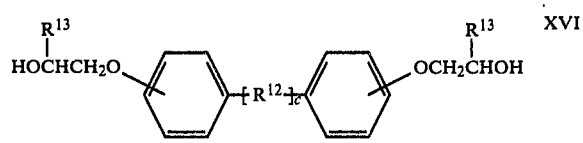

where
$R^{12}$ and c have the meanings previously assigned and each $R^{13}$ denotes a hydrogen atom or a methyl group. Use of such polyhydric alcohols as curing agents for polyimide resins is described in German Auslegeschrift No. 2 459 961.

A further class of curing agents includes polycarboxylic acids, as described in German Auslegeschrift No. 2 459 938. Di- and tricarboxylic acids are preferred, especially an aliphatic dicarboxylic acid of 4 to 10 carbon atoms, such as succinic, glutaric, adipic, 2,2,4- and 2,4,4-trimethyladipic, pimelic, and sebacic acid.

Other curing agents include azomethines of formula

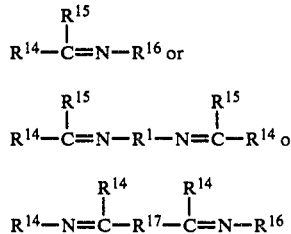

in which
$R^{14}$ denotes a hydrogen atom, a linear or branched aliphatic radical of up to 12 carbon atoms, a cycloaliphatic or cycloaliphatic-aliphatic radical of up to 12 carbon atoms, an aromatic radical of 6 to 12 carbon atoms, an araliphatic radical of 7 to 20 carbon atoms, a heterocyclic radical of 4 to 7 carbon atoms, or a heterocyclic-aliphatic radical of 5 to 18 carbon atoms,
$R^{15}$ and $R^{16}$ have the same meaning as $R^{14}$ except that they cannot denote a hydrogen atom, with the proviso that $R^{14}$ and $R^{15}$ in formulae XVII and XVIII, together with the carbon atom to which they are attached, can also denote a 5- or 6-membered aliphatic ring,
$R^{17}$ denotes a divalent linear or branched aliphatic radical with up to 12 carbon atoms, a divalent cycloaliphatic or cycloaliphatic-aliphatic radical with up to 12 carbon atoms, a divalent aromatic radical of 6 to 12 carbon atoms, a divalent araliphatic radical of 7 to 18 carbon atoms, a divalent heterocyclic radical of 4 to 7 carbon atoms, or a divalent heterocyclic-aliphatic radical, and
$R^1$ is a divalent radical having the meaning previously assigned.

Use of such azeomethines is described in British Specification No. 1,443,067 and U.S. Pat. No. 3,944,525. They may, as described in British Specification No. 1,446,177, be used in conjunction with polyamines such as those of formula XI.

Other suitable curing agents are dimeric, or oligomeric, halogen-containing bis(cyclopentadienyl) compounds of formula

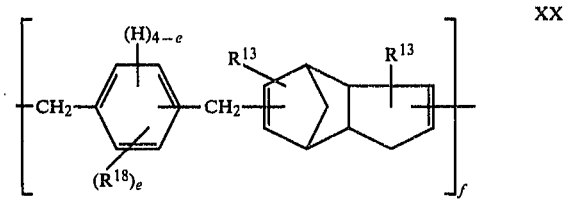

where
$R^{18}$ denotes a fluorine, chlorine, or bromine atom,
e is an integer of 1 to 4,
each $R^{13}$ has the meaning previously assigned, and
f is an integer of average value 2 to 20.

The use of such curing agents for polyimide resins is described in British Specification No. 1,424,075.

There may also be employed as curing agents β-aminocrotonic acid and its derivatives, as described in German Auslegeschrift No. 2 529 092, and also indole and its derivatives, as described in German Auslegeschrift No. 2 544 900.

The former are suitably of any of the following formulae

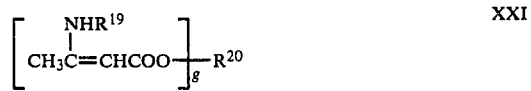

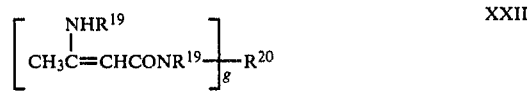

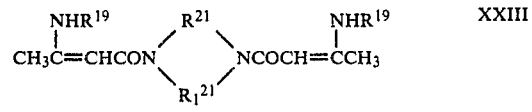

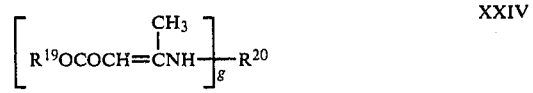

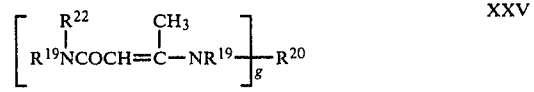

-continued

   XXVI

   XXVII where
R$^{19}$ and R$^{22}$ each denote a hydrogen atom or a linear, branched, or cyclic hydrocarbon radical of 1 to 9 carbon atoms,
R$^{20}$ denotes a divalent linear, branched, or cyclic hydrocarbon radical with 2 to 20 carbon atoms, or a heterocyclic ring containing one or more nitrogen, oxygen, or sulphur atoms,
R$^{21}$ and R$^{21}{}_1$ are such as to form with the two indicated nitrogen atoms a heterocyclic five or six-membered ring,
R$^{23}$ denotes —O— or —NH—,
R$^{24}$ denotes a linear, branched, carbocyclic or heterocyclic radical with 3 to 6 carbon atoms, having a group suitable for polymerisation, such as an allyl group or a group of formula

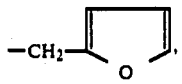   XXVIII and g is an integer of 2 to 4.
Suitable indoles are of formula

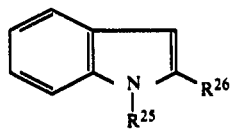   XXIX where
R$^{25}$ denotes a hydrogen atom, an alkyl group of 1 to 4 carbon atoms, or an acyl group of 2 to 5 carbon atoms, and
R$^{26}$ denotes a hydrogen atom or an alkyl group of 1 to 4 carbon atoms.

Acetone-anil, i.e., 2,2,4-trimethyl-1,2-dihydroquinoline, may also be used as the curing agent (see German Offenlegungsschrift No. 2,715,217).

If desired, a mixture of curing agents, e.g., of polyamines with polyhydric phenols or polyhydric alcohols, may be used.

It is within the scope of the invention to employ the polyimide resin and its heat-curing agent in the form of a prepolymer, especially when the agent is a poly-primary amine.

Where members of the above classes of curing agent are of insufficient reactivity, this can often be rectified by adding an ionic, particularly a basic, catalyst, such as a quaternary ammonium base or a sodium alkoxide, but especially a secondary or tertiary amine, such as diethylamine, triethylamine, imidazole, quinoline, benzylamine, N-methylpyrrolidone, or bis(p-dimethylaminophenyl)-methane. Typical amounts are from 0.01 to 5%, and particularly 0.25 to 0.5%, calculated on the total weight of the curable mixture.

A free-radical curing catalyst may also be added, e.g., an organic peroxide or a persalt. Compounds such as di-tert.butyl peroxide, dilauryl peroxide, dicumyl peroxide, tert.butyl cumyl peroxide, or tert.butyl perbenzoate, used in similar concentrations to those in which ionic catalysts are employed, are examples of suitable compounds for this purpose.

The photopolymerisable compounds used in processes of the present invention may be of any chemical type known to polymerise under the influence of actinic radiation. Such materials are described in, for example, Kosar, "Light-sensitive Systems: Chemistry and Applications of Non-Silver Halide Photographic Processes", Wiley, New York, 1965.

As is well known, these materials fall into two main classes—
(i) those which are polymerised through a free-radical chain reaction (photoinitiated polymerisation) and
(ii) those in which polymerisation is effected by reaction of an excited molecule of the monomer with an unexcited molecule of the monomer.

The first type require only one photopolymerisable group per molecule to form long chains on polymerisation while the second type must have at least two photopolymerisable groups per molecule, since if they have only one such group per molecule they will dimerise, but not polymerise, on irradiation.

Photopolymerisable substances of the first type preferred for use in this invention have one ethylenic linkage, or more than one providing they are unconjugated. Preferred examples of these substances are acrylic esters containing at least one group of the general formula XXX, XXXI, or XXXII

   XXX

   XXXI

   XXXII where R$^{27}$ is a hydrogen, chlorine, or bromine atom, or an alkyl hydrocarbon group of 1 to 4 carbon atoms, especially a hydrogen atom or a methyl group. Groups of any of formulae XXX to XXXII may be attached directly to carbon atoms of, e.g., radicals of from 5 to 50 carbon atoms. More specific examples of acrylates are 2,2-dimethylpropane-1,3-diol diacrylate and the esters of formulae XXXIII, XXXIV, and XXXVI to XXXVIII below. Other examples of substances of this type are styrene and crotonic acid.

Formula XXXIII is

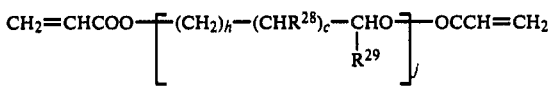

where
c has the meaning previously assigned,
h is an integer of 1 to 8,
j is an integer of 1 to 20,
R$^{28}$ denotes —H, —OH, or —OOCCH=CH$_2$, and
R$^{29}$ denotes —H, —CH$_3$, —C$_2$H$_5$, —CH$_2$OH, or —CH$_2$OOCCH=CH$_2$.

Examples of compounds of formula XXXIII are triethylene glycol diacrylate and tetraethylene glycol diacrylate.

Formula XXIV is

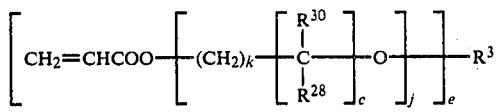

where
c, e, j, and $R^{28}$ have the meanings assigned above,
k is zero or a positive integer, preferably of not more than 8, provided that c and k are not both zero,
$R^{30}$ denotes —H, —Cl, —CH$_3$, or —C$_2$H$_5$, and
$R^{31}$ denotes an organic radical of valency e, linked through carbon atom or carbon atoms thereof to the indicated e terminal oxygen atoms, preferably the hydrocarbon residue of an aliphatic alcohol containing from 1 to 6 carbon atoms, such as —CH$_3$ or

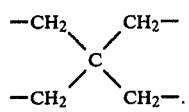 XXXV

A specific example is 2-methoxyethyl acrylate.
Formula XXXVI is

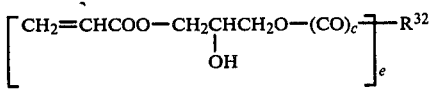

where
c and e have the meanings previously assigned and
$R^{32}$ denotes an organic radical of valency e, linked through a carbon atom thereof other than the carbon atom of a carbonyl group.

More particularly, when c is zero, $R^{32}$ may denote the residue, containing from 1 to 18 carbon atoms, of an alcohol or phenol having e hydroxyl groups.

$R^{32}$ thus represent, for example—
an aromatic group (which may be substituted in the ring by alkyl groups), an araliphatic, cycloaliphatic, heterocyclic, or heterocycloaliphatic group, such as an aromatic group containing only one benzene ring, optionally substituted by chlorine or by alkyl groups each of from 1 to 9 carbon atoms, or an aromatic group comprising a chain of two benzene rings, optionally interrupted by ether oxygen atoms, aliphatic hydrocarbon groups of 1 to 4 carbon atoms, or sulphone groups, each benzene ring being optionally substituted by chlorine or by alkyl groups each of from 1 to 6 carbon atoms,
or, preferably, a saturated or unsaturated, straight or branched-chain aliphatic group, which may contain ether oxygen linkages and which may be substituted by hydroxyl groups, especially a saturated or monoethylenically-unsaturated straight chain aliphatic hydrocarbon group of from 1 to 8 carbon atoms.

Specific examples of such groups are the aromatic groups of the formulae —C$_6$H$_5$ and —C$_6$H$_4$CH$_3$, in which case e is 1, —C$_6$H$_4$C(CH$_3$)$_2$C$_6$H$_4$—, and —C$_6$H$_4$CH$_2$C$_6$H$_4$—, in hich case e is 2, and —C$_6$H$_4$(CH$_2$C$_6$H$_3$)$_a$CH$_2$C$_6$H$_4$—, where a has the meaning assigned above, in which case e is 3 or 4, and the aliphatic groups of formula

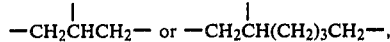

in which case e is 3, or —(CH$_2$)$_4$—, —CH$_2$CH=CHCH$_2$—, —CH$_2$CH$_2$OCH$_2$CH$_2$—, or —(CH$_2$OCH$_2$O)$_2$CH$_2$CH$_2$—. in which case e is 2, or —(CH$_2$)$_3$CH$_3$, —(CH$_2$)$_4$OH, —CH$_2$CH=CH$_2$, —(CH$_2$)$_2$OH, —CH$_2$CH(CH$_3$)OH, or —CH$_2$CH=CHCH$_2$OH, in which case e is 1.

When c is 1, $R^{32}$ may represent the residue, containing from 1 to 60 carbon atoms, of an acid having a carboxyl groups, preferably a saturated or ethylenically-unsaturated, straight chain or branched aliphatic hydrocarbon group of from 1 to 20 carbon atoms, which may be substituted by chlorine atoms and which may be interrupted by ether oxygen atoms and/or by carbonyloxy groups, or
a saturated or ethylenically-unsaturated cycloaliphatic or aliphatic-cycloaliphatic hydrocarbon group of at least 4 carbon atoms, which may be substituted by chlorine atoms, or
an aromatic hydrocarbon groups of from 6 to 12 carbon atoms, which may be substituted by chlorine atoms.

Further preferred are such compounds in which $R^{32}$ represents a saturated or ethylenically-unsaturated straight chain or branched aliphatic hydrocarbon group of from 1 to 8 carbon atoms, optionally substituted by a hydroxyl group, or
a saturated or ethylenically-unsaturated straight chain or branched aliphatic hydrocarbon group of from 4 to 50 carbon atoms and interrupted in the chain by carbonyloxy groups, or
a saturated or ethylenically-unsaturated monocyclic or dicyclic cycloaliphatic hydrocarbon group of 6 to 8 carbon atoms, or
an ethylenically-unsaturated cycloaliphatic hydrocarbon group of from 10 to 51 carbon atoms, or
a mononuclear aromatic hydrocarbon group of from 6 to 8 carbon atoms.

Specific examples of these residues of carboxylic acids are those of the formula —CH$_3$, —CH$_2$CH$_3$, —CH$_2$CH(OH)CH$_3$, —CH$_2$Cl, and —C$_6$H$_5$, in which case e is 1, and —CH$_2$CH$_2$—, —CH=CH—, and —C$_6$H$_4$—, in which case e is 2.

Specific examples of suitable compounds of formula XXXVI are 1,4-bis(2-hydroxy-3-(acryloxy)propoxy)butane, a poly(2-hydroxy-3-(acryloxy)-propyl) ether of a phenol-formaldehyde novolak, 1-(2-hydroxy-3-(acryloxy)-propoxy)-butane, -n-oct:ne, and n-decane, bis(2-hydroxy-3-(acryloxy)-propyl) adipate, 2-hydroxy-3-(acryloxy)propyl propionate, and 3-phenoxy-2-hydroxypropyl acrylate.

Formula XXXVII is

where $R^{33}$ denotes CH$_3$—, C$_2$H$_5$—, or CH$_2$=CHCOOCH$_2$—.

Examples of such acrylates are pentaerythritol tetraacrylate and 1,1,1-trimethylolpropane triacrylate.

Formula XXXVIII is

where $R^{34}$ denotes either an alkyl group of 1 to 6 carbon atoms, optionally substituted by one hydroxyl group, such as an ethyl, n-propyl, n-butyl, 2-hydroxyethyl, or 2-hydroxypropyl group, or a dialkylaminoalkyl group containing in all 3 to 12 carbon atoms, such as a diethylaminoethyl group.

Photopolymerisable materials of the second type include those having at least two, and preferably three or more, groups which are azido, coumarin, stilbene, disubstituted maleimide, pyridinone, chalcone, propenone, or pentadienone groups, or acrylic acid groups which are substituted in their 3- position by groups having ethylenic unsaturation or aromaticity in conjugation with the ethylenic double bond of the acrylic group.

Examples of suitable azides are those containing at least two groups of the formula

  XXXIX or

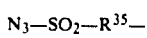  XL where $R^{35}$ denotes a mononuclear or dinuclear aromatic radical containing from 6 to 12 carbon atoms, especially a phenylene or naphthylene group.

Examples of suitable coumarins are those containing groups of the formula

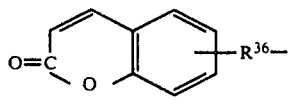

where $R^{36}$ is an oxygen atom, a carbonyloxy group (—COO—), a sulphonyl group, or a sulphonyloxy group.

Examples of photopolymerisable materials containing stilbene groups are those having groups of the formula

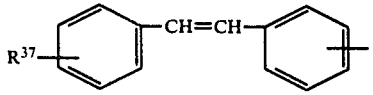  XLII where $R^{37}$ is the residue, containing up to 8 carbon atoms in all, of a five or six-membered nitrogen-containing heterocyclic ring, fused to a benzene or naphthalene nucleus, and linked through a carbon atom of the said heterocyclic ring adjacent to a nitrogen hetero atom thereof to the indicated benzene nucleus, such as a benzimidazolyl, benzoxazolyl, benzotriazolyl, benzothiazolyl, or a naphthotriazolyl residue.

Examples of photopolymerisable materials containing disubstituted maleimide units are those having groups of the formula

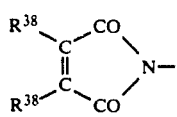  XLIII directly attached to carbon atoms, where each $R^{38}$ is an alkyl group of 1 to 4 carbon atoms, a chlorine atom, or a phenyl group, especially a methyl group.

Examples of photopolymerisable materials containing pyridinone units are those having, directly attached to carbon atoms, groups of the formula

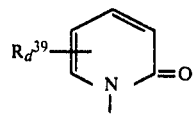  XLIV where
$R^{39}$ is an aliphatic or cycloaliphatic radical of 1 to 8 carbon atoms and
d has the meaning previously assigned.

Examples of compounds containing chalcone, propenone, or pentadienone groups are those containing structures of formula

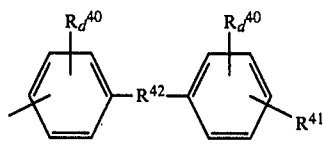  XLV or

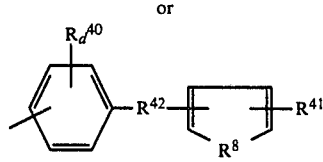  XLVI where
each $R^{40}$ is a halogen atom, or an alkyl, cycloalkyl, alkenyl, cycloalkenyl, alkoxy, cycloalkoxy, alkenoxy, cycloalkenoxy, carbalkoxy, carbocycloalkoxy, carbalkenoxy, or carbocycloalkenoxy group, such organic groups containing 1 to 9 carbon atoms, or is a nitro group, or a carboxyl, sulphonic, or phosphoric acid group in the form of a salt,
d and $R^8$ each have the meanings previously assigned,
$R^{41}$ represents a valency bond or a hydrogen atom,
$R^{42}$ represents a grouping of formula

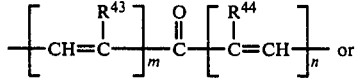  XLVII

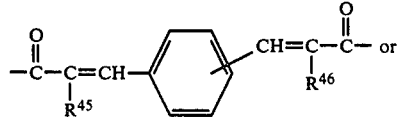  XLVIII

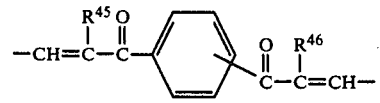  IL wherein
$R^{43}$ and $R^{44}$ are each individually a hydrogen atom, an alkyl group, e.g., of 1 to 4 carbon atoms, or an aryl group of up to 12 carbon atoms, preferably a mononuclear group such as a phenyl group, or conjointly denote a polymethylene chain of 2 to 4 methylene groups,
$R^{45}$ and $R^{46}$ are each a hydrogen atom, an alkyl group, e.g., of 1 to 4 carbon atoms, or an aryl group of up to 12 carbon atoms, preferably a mononuclear group such as a phenyl group, and m and n are each zero, 1, or 2, with the proviso that they are not both zero.

Suitable 3-substituted acrylates contain groups of the general formula $$R^{47}CH=C(R^{27})COO- \qquad L$$

where $R^{47}$ is an aliphatic or mononuclear aromatic, araliphatic, or heterocyclyl group, preferably of not more than 12 carbon atoms, having ethylenic unsaturation or aromaticity in conjugation with the ethylenic double bond shown, such as a phenyl, 2-furyl, 2- or 3-pyridyl, prop-2-enyl, or styryl group, and $R^{27}$ has the meaning previously assigned.

Specific examples of such 3-substituted acrylates are disorbates and bis(2-furylacrylates) of poly(oxyethylene) glycols and poly(oxypropylene)glycols.

If desired, a mixture of photopolymerisable compounds may be used. Especially preferred photopolymerisable compounds are the disorbates and bis(2-furylacrylates) just mentioned.

The molar ratio of polyimide resin to photopolymerisable compound is such that there is sufficient of each present to form both a satisfactory heat-curable composite and a satisfactorily heat-cured composite. Usually the molar ratio is from 10:1 to 1:10, and especially from 5:1 to 1:5.

Preferably the photopolymerisable compound is irradiated in the presence of a photopolymerisable catalyst. Suitable catalysts are well known and are described in, for example, the book by Kosar cited above.

Like the photopolymerisable compounds, the catalysts fall into two main classes (i) those which, on irradiation, give an excited state that leads to formation of free radicals which then initiate polymerisation of the monomer (photoinitiators) and (ii) those which, on irradiation, give an excited state that in turn transfers its excitation energy to a molecule of the monomer, giving rise to an excited molecule of the monomer which then crosslinks with an unexcited molecule of the monomer (photosensitisers).

The first class includes organic peroxides and hydroperoxides, α-halogen substituted acetophenones such as trichloromethyl 4′-tert.-butyl phenyl ketone, benzoin and its alkyl ethers, e.g., the n-butyl ether, α-methylbenzoin, benzophenones, O-alkoxycarbonyl derivatives of an oxime of benzil or of 1-phenylpropane-1,2-dione, such as benzil (O-ethoxycarbonyl)-α-monoxime and 1-phenylpropane-1,2-dione-2-(O-ethoxycarbonyl)oxime, benzil acetals, e.g., its dimethyl acetal, substituted thioxanthones, e.g., 2-chlorothioxanthone, anthraquinones, and mixtures of phenothiazine dyes (e.g. methylene blue) or quinoxalines (e.g., metal salts of 2-(m- or p-methoxyphenyl)-quinoxaline-6′- or 7′-sulphonic acids) with electron donors such as benzenesulphonic acid, toluenesulphonic acid, or other sulphinic acid or a salt thereof such as the sodium salt, an arsine, a phosphine, or thiourea (photoredox systems), these initiators being used with unsaturated esters, especially acrylates and methacrylates, and also acrylamides.

The second class includes 5-nitroacenaphthene, 4-nitroaniline, 2,4,7-trinitro-9-fluorenone, 3-methyl-1,3-diaza-1,9-benzanthrone, and bis(dialkylamino)benzophenones, especially Michler's ketone, i.e., bis(p-dimethylamino)benzophenone.

Suitable photopolymerisation catalysts are readily found by routine experimentation. The catalysts must not, of course, give rise to a substantial degree of photo-induced polymerisation of the polyimide resin, neither should any other substance present: further, they must not cause curing of the polyimide resin under the conditions of photopolymerisation such that the resin does not remain substantially thermosettable.

Generally, 0.1 to 20%, and preferably 0.5 to 10%, by weight of the photopolymerisation catalyst is incorporated, based on the weight of the photopolymerisable compound.

In the photopolymerising step actinic radiation of wavelength 200-600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of the photopolymerisable compound will depend upon a variety of factors which include, for example, the individual compound used, the amount of that compound on the reinforcement, the type of light source, and its distance from the impregnated material. Suitable times may be readily determined by those familiar with photopolymerisation techniques, but in all cases the product after photopolymerisation must still be curable by heating: for this reason, photopolymerisation is carried out at temperatures below those where curing of the polyimide resin by the heat-activated curing agent becomes substantial.

The temperature and duration of heating required for the thermal curing and the proportions of curing agent are readily found by routine experimentation and easily derivable from what is already well known concerning the heat-curing of polyimide resins.

The polyimide resin, the photopolymerisable compound, the thermally-activated curing agent, and, if used, the catalyst for the photopolymerisation, are preferably applied so that the heat-curable composite contains a total of from 20 to 80% by weight of the said components, and, correspondingly, 80 to 20% by weight of the reinforcement. More preferably, a total of 30 to 50% by weight of these components and 70 to 50% by weight of the reinforcement are employed.

As already indicated, when the polymide resin and the photo-polymerisable compound are applied as a film to a fibrous material in the production of prepregs, the components are caused to flow about the fibrous material by applying heat and/or pressure. Of course, heating must not be to an extent such that the prepreg becomes substantially heat-cured. Heated platens or pairs of rollers may be used, for example, and in the latter case, when unidirectional fibres are used, a rolling pressure may be applied in the direction of the fibre alignment. In place of pairs of rollers, the assembly may be passed under tension around part of the periphery of a single roller.

The film may be provided with a strippable backing sheet, e.g., of a polyolefin or a polyester, or of cellulosic paper having a coating of a silicone release agent, on the face opposite to that brought into contact with the fibrous reinforcement. Manipulation of the assembly is often easier if the film has a tacky surface. This may be produced by coating the film with a substance which is tacky at room temperature but which cures to a hard, insoluble, infusible resin under the conditions of heat employed to cure the polyimide resin component of the film. However, an adequate degree of tackiness often exists without additional treatment, especially if the polyimide resin is not too advanced.

Prepregs may be made by a batch process, the fibrous reinforcing material being laid on the film of the photopolymerised composition, which is advantageously under slight tension, when a second such film may, if desired, be laid on top and then the assembly is pressed while being heated.

Prepregs may also be made continuously, such as by contacting the fibrous reinforcing material with the film of the photopolymerised composition, then, if desired, placing a second such film on the reverse face of the fibrous reinforcing material and applying heat and pressure.

More conveniently, two such films, preferably supported on the reverse side by belts or strippable sheets, are applied simultaneously to the fibrous reinforcing material so as to contact each exposed face. When two such films are applied, they may be the same or different.

Multilayer prepregs may be made by heating under pressure interleaved films and layers of one or more fibrous reinforcing materials.

When unidirectional fibres are used as the reinforcement material, successive layers of them may be oriented to form cross-ply prepregs.

With the fibrous reinforcing material there may be used additional types of reinforcement such as a foil of a metal (e.g. aluminium, steel, or titanium) or a sheet of a plastics material (e.g., an aromatic or aliphatic polyamide, a polyimide, a polysulphone, or a polycarbonate) or of a rubber (e.g., a neoprene or acrylonitrile rubber).

In the production of sheet moulding compositions, a mixture of the polyimide resin, the photopolymerisable compound, the thermally-activated curing agent for the polyimide resin, and, if used, the catalyst for photopolymerisation, together with the chopped strand reinforcing material and any other components, are exposed to irradiation in layers through supporting sheets.

The composites may be heat-cured using conditions conventional for the heat-curing of polyimide resins.

The following Examples illustrate the invention. Temperatures are in degrees Celsius and, unless otherwise indicated, parts are by weight. Epoxide contents were determined by titratin against a 0.1 N solution of perchloric acid in glacial acetic acid in the presence of excess of tetraethylammonium bromide, crystal violet being used as the indicator. Flexural strengths are the mean of three results and were determined according to British Standard 2782, Method 304B.

Materials used in the Examples were prepared as follows:

Sorbate A

To a stirred solution of 100 g of polyoxyethylene glycol (having an average molecular weight of 200), 110 g of triethylamine, and 500 ml of toluene at room temperature was added 130.5 g of sorboyl chloride over 30 minutes. The mixture was then stirred at 80° C. for 1 hour, cooled, and filtered. Removal of the solvent under reduced pressure gave the desired polyoxyethylene disorbate.

ACRYLATE A

This is substantially 3-phenoxy-2-hydroxypropyl acrylate, and was obtained by adding, over 1 hour, 222 g of acrylic acid to 500 g of phenyl glycidyl ether (epoxide content 6.16 equiv./kg) stirred at 100° in the presence of 1.5 g of tetramethylammonium chloride and 1 g of 2,6-di-tert.-butyl-p-cresol, and stirring for a further 4 hours at 100°, at which time the epoxide content of the mixture had dropped to 0.92 equiv./kg.

EXAMPLE 1

A mixture of 6.15 parts of 2,2-bis(3-allyl-4-hydroxyphenyl)propane, 7.15 parts of bis(4-maleimidophenyl)methane, 13.3 parts of Sorbate A, and 0.25 part of Michler's ketone was milled on a triple roll mill.

A woven cloth of poly(p-phenylene terephthalamide) fibres was impregnated with the above composition and irradiated on both sides by high pressure metal halide quartz arc lamps for 1 minute to give a prepreg. A laminate was prepared from this prepreg by pressing four 15 cm-square pieces at 180° for 1 hour at a pressure of 1.4 MN/m$^2$.

EXAMPLE 2

A commercially available prepolymer of bis(4-maleimidophenyl)methane and bis(4-aminophenyl)methane (10 parts) was milled on a triple mill with 10 parts of Sorbate A containing 0.2 part of Michler's ketone.

Glass cloth was impregnated with this flowable composition and irradiated on both sides by high pressure metal halide quartz are lamps for 30 seconds to give a prepreg. A laminate was prepared by pressing six 15 cm-square pieces at 180° for 1 hour at a pressure of 1.4 MN/m$^2$. The latter, which consisted of 40.2% resin and 59.8% glass, had a flexural strength of 256 MN/m$^2$.

EXAMPLE 3

A further sample (10 parts) of the prepolymer used in Example 2 was dissolved, together with 2 parts of benzil dimethyl acetal, in 10 parts of Acrylate A.

Glasscloth impregnated with this composition was irradiated for 5 minutes on both sides with high pressure metal halide quartz lamps. A four-ply laminate was made by pressing 15 cm square pieces of the prepreg at 170° for 1 hour at a pressure of 1.4 MN/m$^2$.

EXAMPLE 4

A composition, as described in Example 2 but containing 0.4 part of Michler's ketone, was applied to silicone-coated paper as a layer 36 μm thick and then irradiated for 2 minutes with a high pressure metal halide-quartz arc lamp to form a film. A carbon fibre prepreg was made by placing such a film on both faces of unidirectional carbon fibres (1.8 tows per cm, each tow weighing 0.2 g/m) and pressing for 5 minutes at 100° under an applied pressure of 0.07 MN/m$^2$.

A six-ply laminate was made by pressing 10 cm-square pieces of the prepreg for 170° for 1 hour under a pressure of 1.4 MN/m$^2$. The laminate, which consisted of 64.5% of carbon fibre, had a flexural strength of 226 MN/m$^2$.

What is claimed is:

1. A thermosettable composite comprising:
(a) a fibrous reinforcing material,
(b) a heat-curable polyimide resin containing, per average molecule, at least two groups of formula

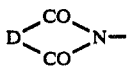

directly attached to carbon atoms, where D denotes

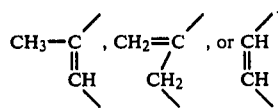

(c) an effective amount of a heat-activated curing agent for said polyimide resin, and
(d) a photopolymerised compound, prepared from the photo-polymerization of a composition comprising 0.1 to 10 moles of a photopolymerizable compound per mole of said polyimide resin, in the presence of components (b) and (c).

2. A composite of claim 1, in which the resin (b) is of the formula

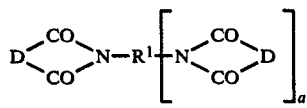

where
$R^1$ is an organic group of valence (a+1), containing from 2 to 30 carbon atoms, attached through carbon atoms thereof to the indicated nitrogen atoms, a is 1 or 2.

3. A composite of claim 2, wherein $R^1$ denotes
a linear or branched alkylene radical of 2 to 12 carbon atoms;
a phenylene radical, optionally substituted in the ring by 1 to 3 methyl groups or by 1 to 3 fluorine, chlorine, or bromine atoms;
a cyclohexylene radical, optionally substituted in the ring by 1 to 3 methyl groups;
a radical of formula

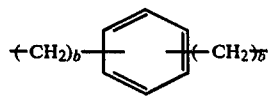

or

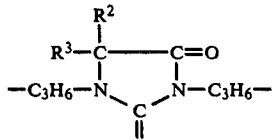

or

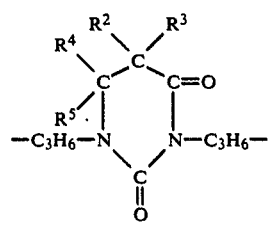

or

-continued

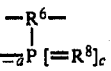

or

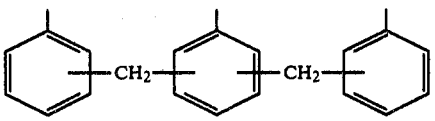

or

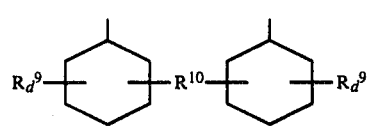

or

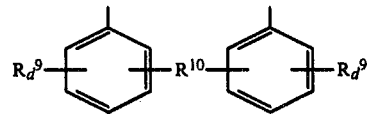

where
a denotes 1 or 2,
b denotes an integer of from 1 to 3,
c denotes zero or 1,
d denotes zero or an integer of 1 to 4,
$R^2$, $R^3$, $R^4$ and $R^5$ each denote a hydrogen atom or the same or a different aliphatic hydrocarbon group of 1 to 6 carbon atoms, with the proviso that $R^2$ and $R^3$ may alternatively, together with the carbon atom to which they are attached, form a 5- or 6-membered aliphatic ring;
$R^6$ denotes an aromatic residue of valence a+2, containing 6 to 15 carbon atoms,
$R^7$ denotes a monovalent aromatic group of 6 to 15 carbon atoms,
$R^8$ denotes an oxygen or sulfur atom,
$R^9$ denotes a methyl group or a chlorine atom, and
$R^{10}$ denotes a carbon-carbon bond, or an atom or group of formula

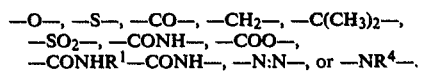

4. A composite of claim 1, wherein the resin (b) is bis(4-maleimidophenyl)methane, bis(4-itaconamidophenyl)methane, bis(4-citraconamidophenyl)methane, 2,2-bis(4-maleimidophenyl)propane, bis(4-maleimidophenyl)sulfone, bis(4-maleimidophenyl)ether, bis(4-maleimidophenyl)ketone, 1,3-bis(maleimido)benzene, 1,4-bis(maleimido)benzene, 1,6-bis(maleimido)hexane, or a compound of formula

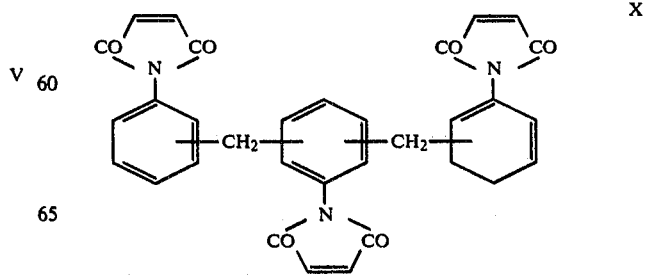

5. A composite of claim 1, wherein the heat-curing agent (c) is a diamine or triamine of formula $$H_2N-R^1\text{\textemdash}NH_2]_a \quad \text{XI}$$

where
$R^1$ is an organic group of valence $(a+1)$, containing from 2 to 30 carbon atoms, and
a is 1 or 2.

6. A composite of claim 1, wherein the heat-curing agent (c) is a polyhydric phenol.

7. A composite of claim 1, in which the heat-curing agent (c) is an alkenylphenol or an ether thereof.

8. A composite of claim 1, in which the heat-curing agent (c) is a polyhydric alcohol.

9. A composite of claim 1, in which the heat-curing agent (c) is a polycarboxylic acid.

10. A composite of claim 1, in which the heat-curing agent (c) is an azomethine of formula

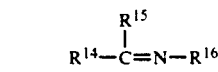  XVII or

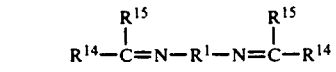  XVIII or

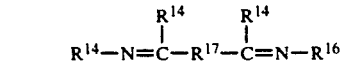  XIX in which
$R^{14}$ denotes a hydrogen atom, a linear or branched aliphatic radical of up to 12 carbon atoms, a cycloaliphatic or cycloaliphatic-aliphatic radical of up to 12 carbon atoms, an aromatic radical of 6 to 12 carbon atoms, an araliphatic radical of 7 to 20 carbon atoms, a heterocyclic radical of 4 to 7 carbon atoms, or a heterocyclic-aliphatic radical of 5 to 18 carbon atoms, $R^{15}$ and $R^{16}$ have the same meaning as $R^{14}$ except that they cannot denote a hydrogen atom, with the proviso that $R^{14}$ and $R^{15}$ in formulae XVII and XVIII, together with the carbon atom to which they are attached, can also denote a 5- or 6-membered aliphatic ring, $R^{17}$ denotes a divalent linear or branched aliphatic radical with up to 12 carbon atoms, a divalent cycloaliphatic or cycloaliphatic-aliphatic radical with up to 12 carbon atoms, a divalent aromatic radical of 6 to 12 carbon atoms, a divalent araliphatic radical of 7 carbon atoms, or a divalent heterocyclic-aliphatic radical, and $R^1$ denotes a divalent organic group of from 2 to 30 carbon atoms.

11. A composite of claim 1, in which the heat-curing agent (c) is a dimeric, or oligomeric, halogen-containing bis(cyclopentadienyl) compound of formula

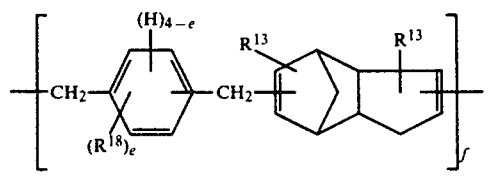 XX where $R^{18}$ denotes a fluorine, chlorine, or bromine atom,
e is an integer of 1 to 4,
each $R^{13}$ denotes a hydrogen atom or a methyl group, and
f is an integer of average value 2 to 20.

12. A composite of claim 1, in which the heat-curing agent (c) is $\beta$-aminocrotonic acid or one of the formulae

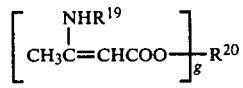 XXI

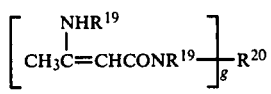 XXII

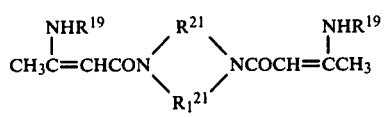 XXIII

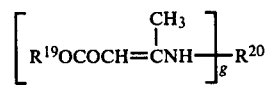 XXIV

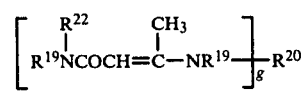 XXV

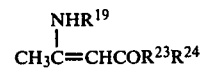 XXVI and

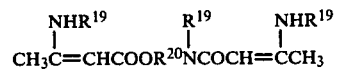 XXVII where
$R^{19}$ and $R^{22}$ each denote a hydrogen atom or a linear, branched, or cyclic hydrocarbon radical of 1 to 9 carbon atoms, $R^{20}$ denotes a divalent linear, branched, or cyclic hydrocarbon radical with 2 to 20 carbon atoms, or a heterocyclic ring containing one or more nitrogen, oxygen, or sulfur atoms, $R^{21}$ and $R_1^{21}$ are such as to form with the two indicated nitrogen atoms a heterocyclic five or six-membered ring, $R^{23}$ denotes —O— or —NH—, $R^{24}$ denotes a linear, branched, carbocyclic or heterocyclic radical with 3 to 6 carbon atoms, having a group suitable for polymerisation, and g is an integer of 2 to 4.

13. A composite of claim 1, in which the heat-curing agent (c) is of the formula

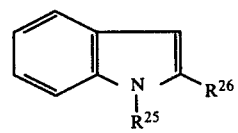 XXIX where
$R^{25}$ denotes a hydrogen atom, an alkyl group of 1 to 4 carbon atoms, or an acyl group of 2 to 5 carbon atoms, and $R^{26}$ denotes a hydrogen atom or an alkyl group of 1 to 4 carbon atoms.

14. A composite of claim 1, in which the heat-curing agent (c) is 2,2,4-trimethyl-1,2-dihydroquinoline.

15. A composite of claim 1, in which the resin (b) is present as a prepolymer with the heat-curing agent (c).

16. A composite of claim 1, in which the photopolymerised compound (d) has been photopolymerized through a free-radical chain reaction.

17. A composite of claim 1, in which component (d) has been obtained by photopolymerisation of a compound containing one ethylenic linkage or, providing they are unconjugated, more than one.

18. A composite of claim 1, in which component (d) has been obtained by photopolymerisation of an acrylic ester containing at least one group of formula

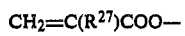
$$CH_2=C(R^{27})COO— \qquad XXX$$

or

$$[CH_2=C(R^{27})CONH]_2CHCOO— \qquad XXXI$$

or

$$CH_2=C(R^{27})CONHCH)OH)CH_2COO— \qquad XXXII$$

where $R^{27}$ is a hydrogen, chlorine, or bromine atom or an alkyl hydrocarbon group of 1 to 4 carbon atoms.

19. A composite of claim 1, in which the photopolymerised compound (d) has been photopolymerised by reaction of an excited molecule of the monomer with an unexcited molecule of the monomer.

20. A composite of claim 1, in which the component (d) has been obtained by photopolymerization of a compound which has at least two groups which are azido, coumarin, stilbene, disubstituted maleimide, pyridinone, chalcone, propenone, or pentadienone groups, or at least two acrylic acid groups which are substituted in their 3-position by groups having ethylenic unsaturation or aromaticity in conjunction with the ethylenic double bond of the acrylic group.

21. A composite of claim 1, in which the component (d) has been obtained by photopolymerisation of a compound which contains at least two groups of the formula

$$N_3—R^{35}— \qquad XXXIX$$

or

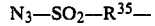
$$N_3—SO_2—R^{35}— \qquad XL$$

where $R^{35}$ denotes a mononuclear or dinuclear aromatic radical containing from 6 to 12 carbon atoms.

22. A composite of claim 1, in which component (d) has been obtained by photopolymerisation of a compound which contains at least two groups of the formula

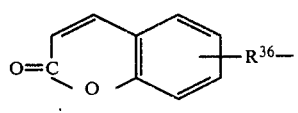

where $R^{36}$ is an oxygen atom, a carbonyloxy group, a sulfonyl group, or a sulfonyloxy group.

23. A composite of claim 1, in which component (d) has been obtained by photopolymerisation of a compound which contains at least two groups of the formula

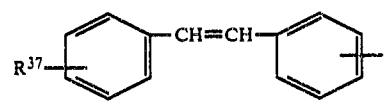

XLII where $R^{37}$ is the residue, containing up to 8 carbon atoms in all, of a five or six-membered nitrogen-containing heterocyclic ring, fused to a benzene or naphthalene nucleus, and linked through a carbon atom of the said heterocyclic ring adjacent to a nitrogen hereto atom thereof to the indicated benzene nucleus.

24. A composite of claim 1, in which component (d) has been obtained by photopolymerisation, of a compound which contains at least two groups of the formula

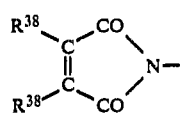

XLIII directly attached to carbon atoms, where each $R^{38}$ is an alkyl group of 1 to 4 carbon atoms, a chlorine atom, or a phenyl group.

25. A composite of claim 1, in which component (d) has been obtained by photopolymerisation of a compound which contains, directly attached to carbon atoms, at least two groups of the formula

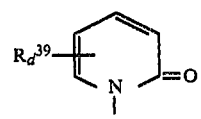

XLIV where
$R^{39}$ is an aliphatic or cycloaliphatic radical of 1 to 8 carbon atoms and d denotes zero or an integer of 1 to 4.

26. A composite of claim 1, in which component (d) has been obtained by photopolymerisation of a compound which contains at least two groups of the formula

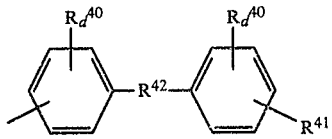

XLV or

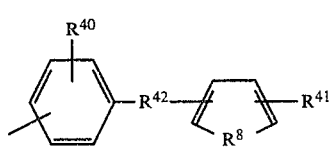

XLVI where
each $R^{40}$ is a halogen atom, or an alkyl, cycloalkyl, alkenyl, cycloalkenyl, alkoxy, cycloalkoxy, alkenoxy, cycloalkenoxy, carbalkoxy, carbocycloalkoxy, carbalkenoxy, or carbocycloalkenoxy group, such organic groups containing 1 to 9 carbon atoms, or is a nitro group, or a carboxyl, sulfonic, or phosphoric acid group in the form of a salt, d denotes zero or an integer of from 1 to 4, $R^{41}$ represents a valence bond or a hydrogen atom, $R^{42}$ represents a grouping of formula

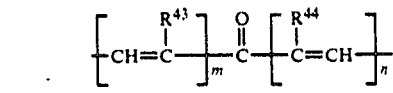 XLVII or

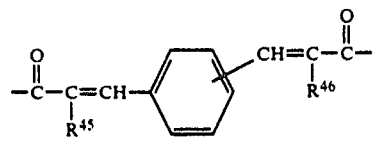 XLVIII or

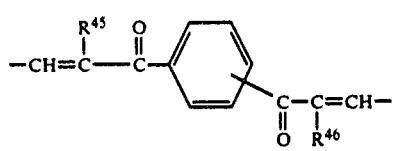 IL wherein $R^{43}$ and $R^{44}$ are each individually a hydrogen atom, an alkyl group, or an aryl group of up to 12 carbon atoms, or $R^{43}$ and $R^{44}$ conjointly denote a polymethylene chain of 2 to 4 methylene groups, $R^{45}$ and $R^{46}$ are each a hydrogen atom, an alkyl group, or an aryl group of up to 12 carbon atoms, m and n are each zero, 1, or 2, with the proviso that they are not both zero, and $R^8$ denotes an oxygen atom or a sulfur atom.

27. A composite of claim 1, in which component (d) has been obtained by photopolymerisation of a compound which contains at least two groups of the formula

 L where $R^{27}$ is a hydrogen, chlorine, or bromine atom, or an alkyl hydrocarbon group of 1 to 4 carbon atoms and $R^{47}$ is an aliphatic or mononuclear aromatic, araliphatic, or heterocyclyl group which has ethylenic unsaturation or aromaticity in conjugation with the ethylenic double bond shown.

28. A composite of claim 1, in which component (d) has been obtained by photopolymerisation of a disorbate of a poly(oxyethylene)glycol, or a bis(2-furylacrylate) of a poly(oxyethylene) glycol, a disorbate of a poly(oxypropylene) glycol, or a bis(2-furylacrylate) of a poly(oxypropylene) glycol.

* * * * *